Feb. 5, 1963  J. P. WATSON  3,076,905
CONTINUOUSLY ROTATING AXIAL FLUX ELECTROMAGNETIC MACHINERY
Original Filed Aug. 31, 1956  2 Sheets-Sheet 1
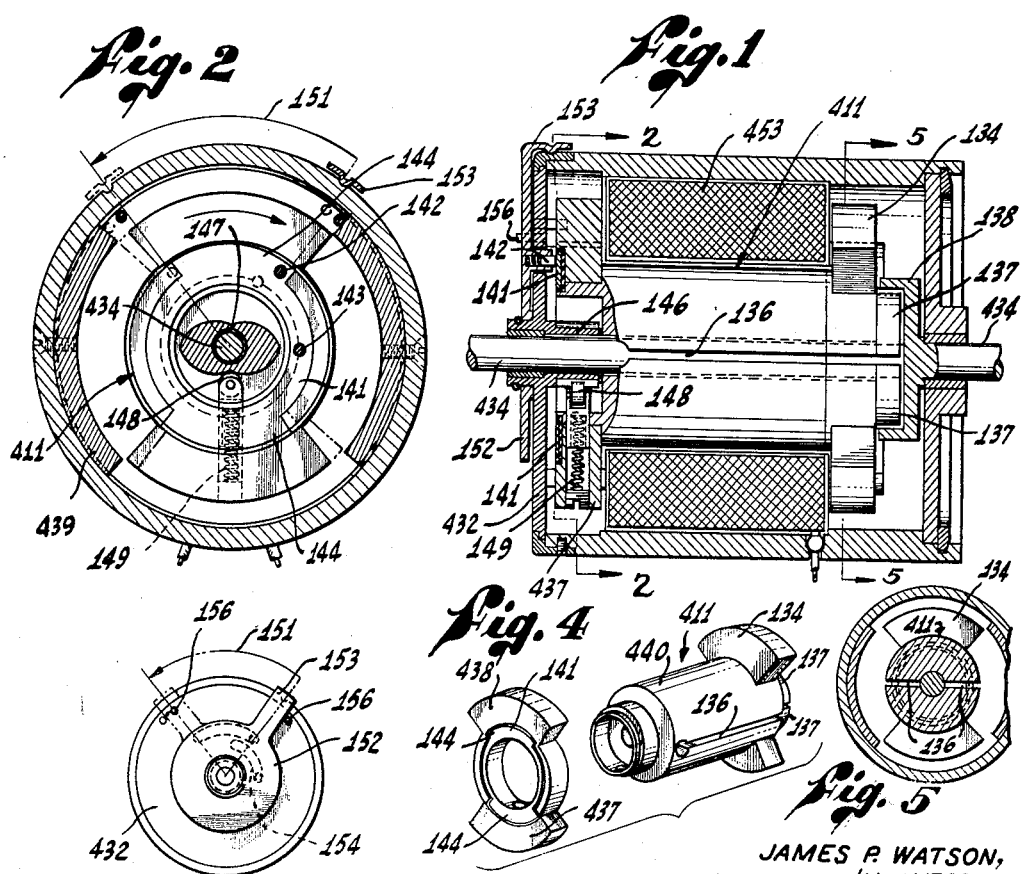
JAMES P. WATSON,
INVENTOR.
HERZIG & JESSUP,
ATTORNEYS.
BY Warren T. Jessup Feb. 5, 1963  J. P. WATSON  3,076,905
CONTINUOUSLY ROTATING AXIAL FLUX ELECTROMAGNETIC MACHINERY
Original Filed Aug. 31, 1956  2 Sheets-Sheet 2
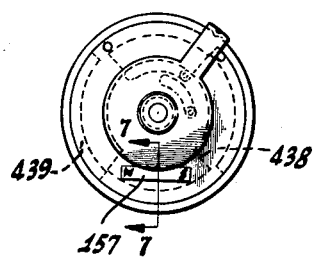
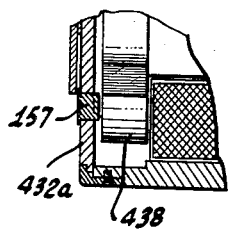
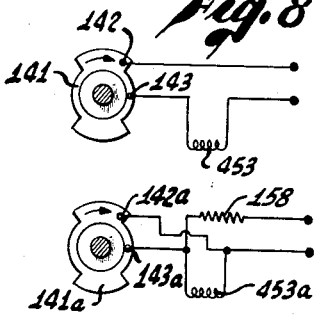
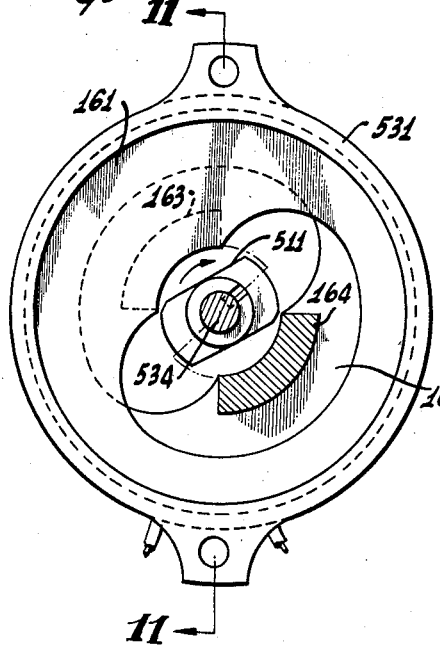
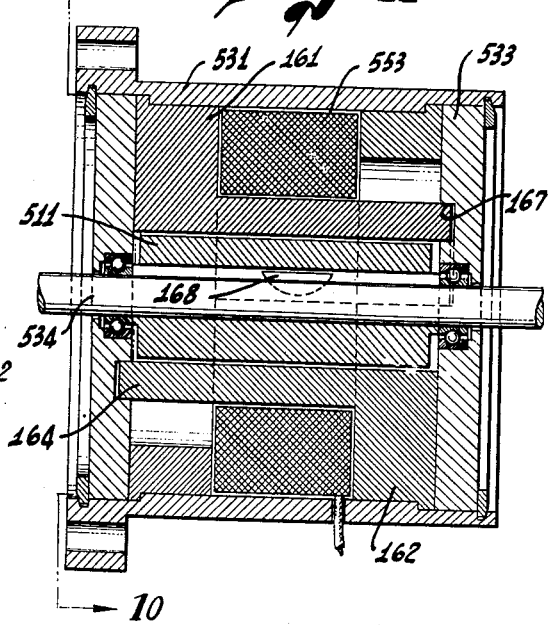
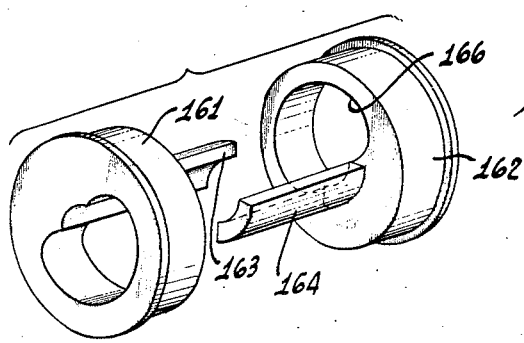
JAMES P. WATSON,
INVENTOR.
HERZIG & JESSUP,
ATTORNEYS.
By Warren T. Jessup United States Patent Office 3,076,905
Patented Feb. 5, 1963

3,076,905
CONTINUOUSLY ROTATING AXIAL FLUX
ELECTROMAGNETIC MACHINERY
James P. Watson, Inglewood, Calif.
(P.O. Box 108, South Gate, Calif.)
Original application Aug. 31, 1956, Ser. No. 607,422, now Patent No. 2,866,109, dated Dec. 23, 1958. Divided and this application Aug. 4, 1958, Ser. No. 752,880
2 Claims. (Cl. 310—46)

This invention relates to rotating electromagnetic machinery.

This is a division of application Serial No. 607,422 filed August 31, 1956, applicant James P. Watson, for Axial Flux Electromagnetic Machinery, which has now issued as Patent No. 2,866,109.

It is an object of this invention to provide a complete machine which is not adversely affected by the severest acceleration forces, even during actual operation.

It is an object of this invention to provide a compact, simple rotary electromagnetic machine, wherein magnetic flux is produced and flows axially in the rotor and stator of the machine.

It is a further object of this invention to provide improved pawl and ratchet arrangements which may be used with rotating electromagnetic machinery, or which may be used if desired in other types of apparatus.

It is another object of this invention to provide improved clutch means for an electromagnetic rotating machine.

It is a further object of this invention to provide improved detent means for indexing a rotating part with respect to a stationary part as the rotating part comes to rest.

In accordance with these and other objects which will become apparent hereinafter, preferred forms and examples of the present invention will now be described with reference to the accompanying drawings wherein:

FIG. 1 is a longitudinal section of a form of the present invention;

FIG. 2 is a cross section taken on line 2—2 in FIG. 1;

FIG. 3 is an end view illustrating certain features of operation of the machine shown in FIG. 1;

FIG. 4 is an exploded perspective view of the rotor of the machine in FIG. 1;

FIG. 5 is a cross section (reduced) taken on line 5—5 in FIG. 1;

FIG. 6 is a view generally similar to FIG. 3 showing an alternative modification of the machine of FIG. 1;

FIG. 7 is a view taken on line 7—7 in FIG. 6;

FIGS. 8 and 9 are alternate wiring diagrams illustrating methods of connecting the electrical portions of the machine shown in FIG. 1;

FIG. 10 is an end view of another form of the present invention taken with the end bell or plate removed, along line 10—10 in FIG. 11;

FIG. 11 is a longitudinal section taken on line 11—11 in FIG. 10; and,

FIG. 12 is an exploded perspective view of the stator poles of the machine shown in FIG. 11.

A continuously running machine is shown in FIGS. 1–5. In this embodiment, the rotor 411 is provided at one end with a pair of opposed salient poles 134, and the other end with a pair of opposed salient poles 438. The rotor is split longitudinally, as shown at 136, between the poles 134, so that by virtue of the resilience of the metal of which the rotor 411 is made, the poles 134 may be sprung outward slightly. The rotor 411 extends outwardly beyond the poles 134 to form a pair of clutch portions (one on each side of the split 136) denoted by the numeral 137. The clutch portions 137 ride just inside the flange of a cupped shaped clutch member 138 which is formed integral with the shaft 434 of the machine.

The rotor 411 is journaled on the shaft 434, being free to rotate thereon, except when clutched thereto.

When current is applied to the coaxial coil 453 the magnetic flux between the rotor and the stator poles tends to open the splits 136 slightly, thereby bringing the portions 137 into frictional engagement with the cup shaped clutch member 138, and thus the rotor 411 is clutched to the shaft 434. As the rotor speeds up this clutching action, effected through the pull of the magnetic flux on the poles 134, is enhanced by the centrifugal force, which also tends to separate the pole pieces 134 and drive parts 137 into firmer engagement with the clutch member 138.

For ease of construction the rotor 411 is made in two parts 440 and 437, as shown in FIG. 4.

As noted hereinbefore, the machine of FIG. 1 is a continuously rotating machine. This is effected by arranging switch means in the circuit of the coil 453 which intermittently opens and closes the circuit to the coil 453. The switch means is so arranged that the coil is energized when the rotor and stator poles are separated, and then as the poles are drawn into juxtaposition, the circuit is broken, allowing the rotational momentum to continue to rotate the rotor until the poles are in position to be attracted by the opposite stator poles, at which time the circuit is re-made.

In FIG. 1, this circuit means is provided by placing an annular slip ring 141 embedded in the face of the rotor part 437 and mounting a pair of brushes 142 and 143 in the end plate 432, which closes the left hand end of the machine. The brush 143 rides continuously against the slip ring 141 whereas the brush 142 rides against the slip ring 141 only during two portions of the revolution, by virtue of the salient portions 144 formed on the ring 141. In between, the brush 142 simply slides against the insulation mounted in the outer face of the rotor part 437, in which the ring 141 is embedded.

The annular slip ring is insulated from the rotor 437, and the brushes 142 and 143 are insulated from the end plate 432. The electrical circuitry is shown schematically in FIG. 8, wherein it will be readily seen that as the rotor rotates, there are two portions of each revolution when the circuit is completed to the coil 453, and two portions when the circuit is broken. The brushes and slip ring are so arranged that the coil is energized when the pole pieces 438 and 134 are spaced from the stator poles 439.

In order to insure that the rotor will always come to rest in proper position to be started in its desired direction, the end plate 432 is provided with an inwardly projecting hub 146 which carries a double pointed cam 147. Against the cam 147 rides a roller 148, which is mounted for radial movement in the rotor part 437 and pressed inwardly against the cam by a bias spring 149. Thus, no matter where the rotor might normally tend to come to rest, the roller 148 bearing against the cam 147 cams the rotor into one of two positions, these positions being such that upon re-energization of the coil 453 the rotor will start to rotate in the desired direction. From there on, the intermittent opening and closing of the circuits through the brush 142 keeps it rotating in the same direction. This positioning of the rotor by the cam 147 is so arranged that the pole pieces 438 and 134 are slightly closer to one edge of the stator poles than they are to the other, thus insuring that the rotor will start up in the right direction.

In order to reverse rotation, the brushes 142 and 143 are shifted arcuately as shown by the arrowed line 151. This shifting is effected by mounting the brushes 142 and 143 not actually on the end plate 432 but instead on a circular plate 152 which may be angularly adjusted with respect to the end plate 432 by means of a radial arm 153. To this end the brushes 142 and 143 project through respective arcuate slots 154 in the cover plate 432. Mounting of brush 143 on plate 152, so that it shifts therewith, is not necessary to the reversal of direction, but is a structural convenience to avoid building the reversing structure around the brush 143.

Reversal of the motor direction requires that the position of the cam 147 also be shifted slightly, and this is done by providing a pair of pins 156 in the cover plate 432 which are engaged and pushed slightly by the arm 153 toward the extremities of each of its two adjustment directions, as shown in FIG. 3. Thus the slight arcuate shifting of the cover plate 432 shifts the cam 147 the desired amount to bring about the proper re-positioning of the rotor with respect to the stator in order to reverse direction of rotation.

While the clutch illustrated at 137 and 138 may be omitted if desired, it is preferable to include some means for de-coupling the rotor from the output shaft in order that the spring pressed positioning follower 148 might not be required to position the entire load to which the shaft 434 is connected but need position only the rotor itself. Where the load is extremely light, it is possible to couple the shaft 434 directly to the rotor 411 by keying or other well known means.

It will be noticed that the cam arrangement 147 and 148 for positioning the rotor after de-energization of the coil 453 is so arranged that the radially movable roller 148 is mounted in the rotor. In this manner, as the motor comes up to speed, the roller 148 is thrown outward by centrifugal force and does not touch the cam 147. This eliminates the intermittent contact and consequent possible jerking action which would otherwise result and also minimize wear between the cam 147 and the roller 148.

If desired, magnetic means may replace the cam means for positioning the rotor during quiescent periods. Such a means is shown in FIGS. 6 and 7, wherein a permanent magnet 157 is mounted in the end plate 432a of the stator and disposed in a generally tangential attitude. The poles of the magnet 157 co-act with the salient poles 438 of the rotor 411 to position the rotor in one of two predetermined positions as the rotor slows down and comes to rest. As in the modification shown in FIG. 1 the magnet 157 is shifted slightly just as the cam 147 was shifted, whenever the arm 153 is pivoted to reverse the direction of rotation.

In FIG. 9 there is shown an alternating wiring arrangement for the motor wherein the problem of arcing between the brush 142 and the annular slip ring 141 is greatly minimized. In this diagram the coil 453a is permanently connected to a source of power through a series resistor 158. The brushes 142a and 143a are a part of a circuit which shunts out the coil 453a, thereby in effect de-energizing the machine and demagnetizing the rotor 411. Thus the magnetic effect of the two circuits shown in FIGS. 8 and 9 respectively is substantially the same, but the breaking of contact between the brush 142a and the slip ring 141a, instead of opening a highly inductive circuit, merely removes a short circuit from across the coil 453 and allows the current to flow through the coil 453a. The result is that arcing at the brush 142a is substantially eliminated.

When the circuit is closed through the annular slip ring 141a the energy which is inductively stored in the coil 453a dissipates through the slip ring 141a. However, since the brushes 142a and 143a are in closed circuit position, they are much more able to withstand the heavy current than would be the case were they opening rather than closing.

Another form of the present invention is illustrated in FIGS. 10–12, wherein the machine is shown as comprising a stator consisting of a case 531 made of ferro-magnetic, non-retentive material and a pair of opposed stator pole pieces 161 and 162 provided with respectively opposed longitudinally extending arcuate stator poles 163 and 164. The end of each pole, for example the pole 163, extends through a large clearance opening 166 formed in the opposite stator 162, and is supported in an arcuate groove 167 formed on the interior face of the non-magnetic end plate 533. The pole 164 is similarly arranged at the opposite end of the machine.

Disposed between the poles 163 and 164 is a rotor 511 keyed at 168 to the shaft 534 journaled in and passing through the non-magnetic end plates. The rotor 511 is in the shape of a flattened cylinder as shown in FIG. 10 so that in one position it forms the best magnetic path between the opposed faces of the poles 163 and 164, while in a position 90° displaced therefrom, it forms the poorest magnetic path.

Coaxially circumjacent the stator poles 163 and 164 is the energizing coil 553, which serves to effect a magnetic flux axially in the stator poles 163 and 164 and in the case 531.

Because the two stator poles 163 and 164 are magnetically open circuited, the flux path must extend diametrically across the machine between the poles 163 and 164. This creates a magnetic field tending to draw the rotor 511 into a position directly spanning the two poles. In this way, energization of the coil 553 causes rotation of the rotor 511 and shaft 534.

Any suitable means is provided for intermittently making and breaking the circuit of the coil 553 to produce the result discussed hereinbefore in connection with FIG. 1. Thus the coil 553 is intermittently energized to rotate the rotor 511 toward alignment with the poles and then the circuit is opened allowing the momentum of the rotor to carry it around until it is ready to be drawn again toward the poles by re-energization of the coil 553.

As in the embodiment shown in FIG. 1, it is preferred to provide suitable means for declutching or uncoupling the shaft 534 from its load when the power is turned off.

Means should also be provided along the lines indicated in FIG. 1 for positioning the rotor 511 as it comes to rest following de-energization of the coil 553 in order to properly position it for starting in the proper direction when the coil 553 is re-energized.

Reversal of shaft rotation may be effected as in FIG. 1.

All embodiments shown herein operate on either A.C. or D.C.

While the instant invention has been shown and described herein in what are conceived to be the most practical and preferred embodiments, it is recognized that departures may be made therefrom within the scope of the invention which is therefore not to be limited to the details disclosed herein, but is to be accorded the full scope of the claims.

What is claimed is:

1. In a rotary machine, a stator, a shaft rotatably mounted in said stator, a detent cam secured to said stator and disposed coaxially with respect to said shaft, a detent slidably mounted to said shaft for generally radial movement with respect to said shaft, and for rotation circumjacent said cam, said detent being adapted to bear inwardly against said cam, and means resiliently biasing said detent against said cam to urge said shaft to a predetermined angular position relative to said stator, rotation of said shaft serving, by centrifugal force, to urge said detent away from said detent cam against the action of said biasing means.

2. Rotary magnetic machine comprising a stator having poles, a rotor rotatably mounted in said stator and having poles on at least one end thereof cooperating with said stator poles, said rotor being longitudinally split between said poles, said poles by virtue of said split being capable of being pulled apart slightly against the resilience of the material of which the rotor is made, an electric coil coaxially circumjacent said rotor for producing an axial flux in said rotor and stator, a clutch member circumjacent a split portion of said rotor and shaft means rotatably mounting said clutch coaxially in alignment with said rotor, energization of said coil producing an outward magnetic pull on the poles of said rotor to bring said rotor into engagement with said clutch thereby coupling it to said clutch shaft.

References Cited in the file of this patent

UNITED STATES PATENTS

| | | |
|---|---|---|
| 500,135 | Jones | June 27, 1893 |
| 843,287 | MacCoy | Feb. 5, 1907 |
| 876,211 | Miller | Jan. 7, 1908 |
| 909,483 | Unterberg | Jan. 12, 1909 |
| 1,156,916 | Merritt | Oct. 19, 1915 |
| 2,378,668 | Vickers | June 19, 1945 |
| 2,473,839 | Altfather | June 21, 1949 |
| 2,624,017 | Putnocky | Dec. 30, 1952 |
| 2,797,346 | Ranseen | June 25, 1957 |
| 2,812,454 | Buck | Nov. 5, 1957 |

FOREIGN PATENTS

| | | |
|---|---|---|
| 400,435 | Great Britain | Oct. 26, 1933 |